US007008595B2

(12) United States Patent
Pankaj et al.

(10) Patent No.: US 7,008,595 B2
(45) Date of Patent: Mar. 7, 2006

(54) RESID CRACKING APPARATUS WITH CATALYST AND ADSORBENT REGENERATORS AND A PROCESS THEREOF

(75) Inventors: Kawliwal Pankaj, Faridabad (IN); Rama Rao Marri, Faridabad (IN); Dixit Jagdev Kumar, Faridabad (IN); Saroya Latoor Lal, Faridabad (IN); Sukumar Mandal, Faridabad (IN); Satish Makhija, New Delhi (IN); Sobhan Ghosh, Faridabad (IN)

(73) Assignee: Indian Oil Corporation Limited, Bandra (IN)

( * ) Notice: Subject to any disclaimer, the term of this patent is extended or adjusted under 35 U.S.C. 154(b) by 716 days.

(21) Appl. No.: 10/140,364

(22) Filed: May 8, 2002

(65) Prior Publication Data

US 2003/0211017 A1 Nov. 13, 2003

(51) Int. Cl.
*B01J 8/08* (2006.01)
*B01J 8/18* (2006.01)
*C10G 11/00* (2006.01)
*C10G 11/18* (2006.01)

(52) U.S. Cl. ............... 422/141; 422/139; 422/144; 422/145; 422/147; 208/113

(58) Field of Classification Search ........... 422/139, 422/141, 144, 145, 147; 208/113
See application file for complete search history.

(56) References Cited

U.S. PATENT DOCUMENTS

| 4,064,038 A | 12/1977 | Vermilion, Jr. ........ 208/120.01 |
| 4,787,967 A | 11/1988 | Herbst et al. ............... 208/77 |
| 4,814,068 A | 3/1989 | Herbst et al. ............. 208/155 |
| 4,830,728 A | 5/1989 | Herbst et al. ............... 208/78 |
| 4,875,994 A | 10/1989 | Haddad et al. ........... 208/113 |
| 4,892,643 A | 1/1990 | Herbst et al. ............... 208/70 |
| 4,895,637 A | 1/1990 | Owen ......................... 208/113 |
| 4,944,865 A | 7/1990 | Occelli et al. ............. 208/121 |
| 4,990,314 A | 2/1991 | Herbst et al. ............. 422/144 |
| 5,021,222 A | 6/1991 | Owen ......................... 422/144 |
| 5,059,302 A | 10/1991 | Weinberg et al. ............ 208/91 |
| 5,110,775 A | 5/1992 | Owen ........................... 502/43 |
| 5,196,172 A | 3/1993 | Weinberg et al. .......... 422/144 |
| 6,149,875 A | 11/2000 | Rao et al. .................. 422/144 |

*Primary Examiner*—Alexa D. Neckel
(74) *Attorney, Agent, or Firm*—Lowe Hauptman & Berner

(57) ABSTRACT

This invention provides a resid cracking apparatus comprising a riser, reactor, stripper cum separator with adjustable outlets in flow communication with adsorbent and catalyst regenerators for converting hydrocarbon residues containing higher concentration of conradson carbon content, poisonous metals such as nickel & vanadium and basic nitrogen etc., into lighter and valuable products and a process thereof.

31 Claims, 3 Drawing Sheets

Figure 1:
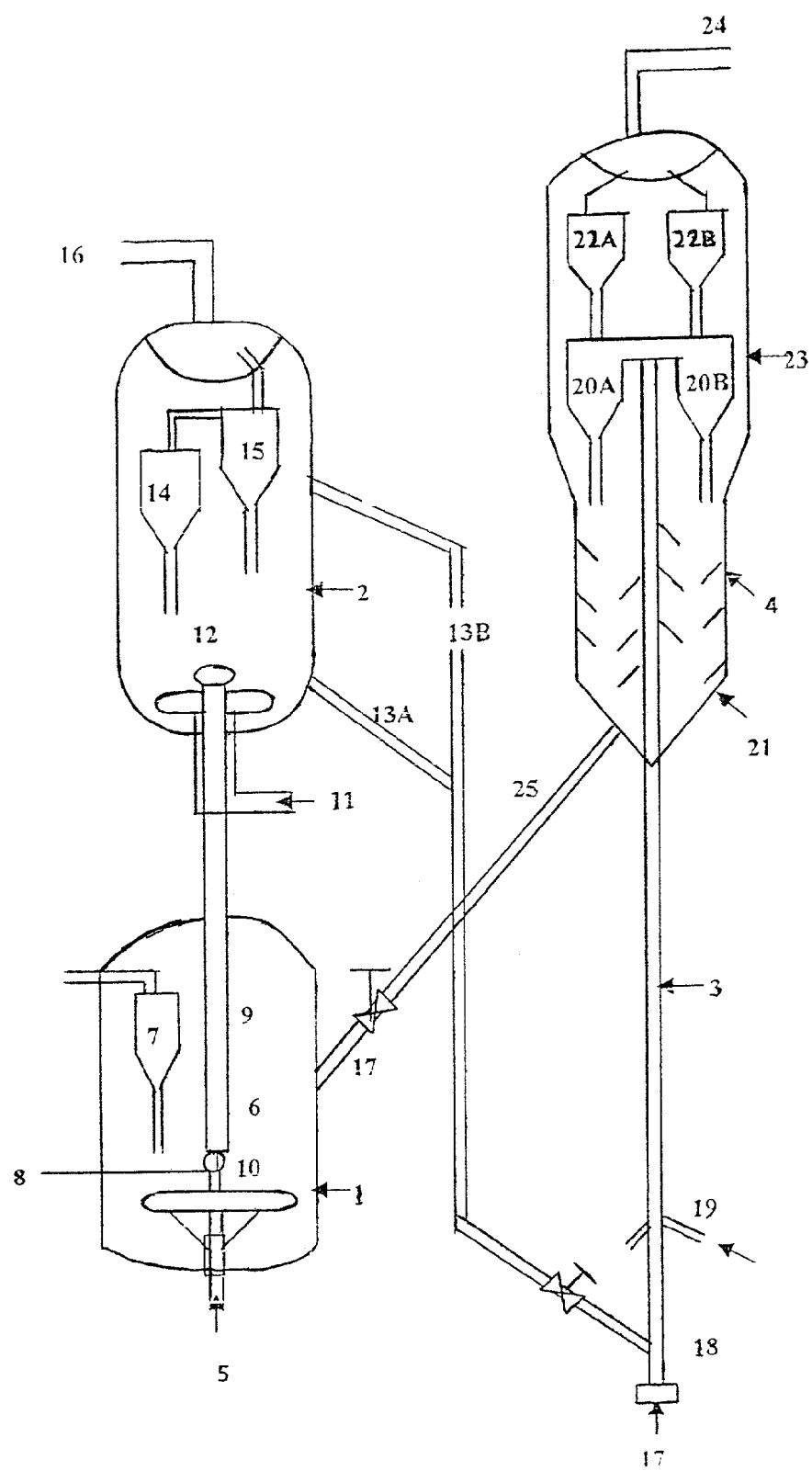

RESID CRACKING APPARATUS WITH CATALYST AND ADSORBENT REGENERATORS AND A PROCESS THEREOF

FIELD OF THE INVENTION

This invention relates to a resid cracking apparatus comprising a riser, reactor, stripper cum separator adsorbent and catalyst regenerator for converting hydrocarbon residues containing higher concentration of conradson carbon content, poisonous metals such as nickel & vanadium and basic nitrogen etc., into lighter and valuable products and a process thereof.

BACKGROUND AND PRIOR ART OF THE INVENTION

Fluid Catalytic Cracking (FCC) is one of the key processes employed in petroleum refineries for converting heavy vacuum gas oil into lighter products namely gasoline, diesel and liquefied petroleum gas (LPG). Processing of heavy residues e.g. atmospheric and vacuum bottoms are increasingly being practiced in the FCC Unit for enhanced conversion of residue. Heavy residues contain higher amount of Conradson carbon residue (CCR), poisonous metals e.g. sodium, nickel, vanadium and basic nitrogen compounds etc., all of which have significant impact on the performance of FCC unit and the stability of its catalyst.

The high CCR of the feed tends to form coke on the catalyst surface, which in turn brings down the catalyst activity and its selectivity. Moreover, the higher deposit of coke on the catalyst increases the regenerator temperature and therefore catalyst/oil ratio reduces to maintain the heat balance of FCC unit. The FCC catalyst can tolerate a maximum temperature of up to 750° C., which limits the CCR of feed that can be processed in FCC unit. At present, FCC unit with two stages regenerators and catalyst coolers can handle feed CCR up to 8-wt % economically.

Nickel, vanadium and sodium are also present in large quantity in the residual feed. The poisoning effects of these constituents are well known in the FCC art. In the past, there have been some efforts to passivate the damaging effects of nickel and vanadium on the catalyst. These efforts have resulted only with some success in the passivation of nickel. Thus, by the known methods, it is presently possible to handle up to 30 PPM of nickel on the feed and up to 10,000-PPM nickel on the equilibrium catalyst. Similarly, with the known processes, vanadium up to only 30 PPM on feed and 15000 PPM on the equilibrium catalyst can be handled economically. These above limits pose serious problem of residue processing capability of FCC unit. As such, huge quantity of metal laden equilibrium catalyst is withdrawn from resid FCC (RFCC) unit to keep the circulating catalyst metal level within the tolerable limit. As regards the passivation of basic nitrogen compounds, suitable passivation technology is yet to be found.

In addition to the developments of passivation technologies, there have been some important design changes made in FCC for efficient residue processing. One such design change is the two-stage regeneration in place of single stage regeneration. U.S. Pat. No. 4,064,038 teaches the advantages of two-stage regenerator and its flexibility to handle additional feed CCR without requiring catalyst cooler. However, even with two-stage regenerator of U.S. Pat. No. 4,064,038, there is limitation to increase feed CCR above 4.5-wt % and vanadium above 15–20 PPM on feed.

It has been suggested in the art to use a separable mixture of catalyst and demetallizing additive particles. For example, in U.S. Pat. Nos. 4,895,637, 5,021,222 and 5,110,775, suggest a physically separable mixture of FCC catalyst and demetallizing additive having sufficient differences in their settling velocities so as to cover a segregation of the two types of particles in a single stage regenerator. Though such a process is simple, there are several practical disadvantages, which limit its resid-handling capability, namely (I) the regenerator is kept in the dense phase where the average superficial velocity is about 0.7 meter/second. At such a velocity level, the catalyst particles still possess considerable downward gravitational pull. Moreover, there is a sufficient turbulence and mixing in the bed, which leads to poor segregation efficiency (II) it is known in the FCC art that vanadium is highly mobile in the regenerator atmosphere, and that too in the single stage regenerator, the vanadium may escape from the demetallizing additive to the catalyst particle at these conditions. This defeats the basic purpose of eliminating catalyst deactivation due to metal poisoning.

Haddad et al has addressed some of these issues in U.S. Pat. No. 4,875,994 where combustor type two-stage regenerator is proposed. High velocity combustion air is used to lift the catalyst particles from the combustor. However, the mobile vanadium vapors are allowed to move to the high temperature regenerator through lift line along with the catalyst, which may cause considerable damage to zeolite in the catalyst particles. In addition, the downcomer line from the regenerator to the combustor may allow the separated catalyst particle to again get mixed with the additive. When very high CCR feed is processed, $1^{st}$ stage regenerator is expected to see high dense bed temperature. As the additive cooler is provided at downstream of first stage regenerator, it is difficult to control dense bed temperature, which will further aggravate the destruction of zeolite structure.

U.S. Pat. No. 4,814,068 discloses a multistage process with three sets of intermediate riser, U bend, mixing and flue gas system. Such a scheme is used to separate large pore catalyst particles from those having intermediate pores in regenerator. The purpose is to reduce hydrothermal deactivation of ZSM-5 additive. The particle size of the coarse particles is also very high (500–70000 microns) to avoid the carryover of coarse particles to the second stage regenerator. The attrition resistance will be poor with such coarse particles.

Similarly, U.S. Pat. Nos. 4,990,314, 4,892,643 and 4,787,967 also cover separation of two very different size particles one having 20–150 micron and the other 500–70,000 microns. Here the stripper section is made annular double stage; thereby the difference in settling velocity of the above two-size range of particles is exploited. The focus was to minimize the frequency of ZSM-5 additive regeneration. However, these inventions do not address the issues related to minimization of metal deactivation of catalyst and removal of feed CCR as arises in residue processing in FCC.

A process and apparatus is disclosed in U.S. Pat. No. 4,830,728 for upgrading naphtha in fluid catalytic cracking operation employing multiple risers with a zeolite Y catalyst and ZSM-5 mixture. Separation of ZSM-5 having particle size in the range of 500–70000 microns from zeolite Y catalyst of particle size range 20–150 microns in FCC stripper. A conical perforated plate or sieve provided at an intermediate location in stripper in such a way that larger & denser ZSM-5 is retained above the plate/sieve and the smaller & lighter catalyst/passes through plate/sieve and settles at the bottom of stripper. The separation mechanism adapted here is different from the present invention. Moreover, this patent does not address the issues pertaining to the problems of avoiding CCR and metal deactivation of catalyst while processing residue in FCC units.

The inventions of U.S. Pat. Nos. 5,059,302 and 5,196,172 claim of FCC process and apparatus employing a separable mixture of catalyst and sorbent particles. Here the adsorbent particles are smaller in size (30–90 microns) and the catalyst particles are bigger in size (80–150 micron). The process employs selective vortex pocket classifier and horizontal cyclone type burner/combustor to continuously separate the two types of particles and works based on the difference in centrifugal forces. As the segregation and regeneration of sorbent and catalyst is carried out in first stage regenerator, the vanadium may migrate from the sorbent to the catalyst particle and destroy zeolite structure of the catalyst at such high temperature conditions.

U.S. Pat. No. 6,149,875 deals with removal of CCR and metal contaminants in the heavy feed. However, the apparatus employed in this patent is different from that of present invention. In addition, the difference between transport velocity of catalyst and adsorbent is exploited for segregating catalyst from adsorbent. The superficial gas velocity in separator vessel is very high and is operated in different domain (turbulent/fast fluidization) vis-à-vis bubbling bed regime of the present invention.

OBJECTS OF THE INVENTION

The main object of the present invention is to provide a resid cracking apparatus and process for converting heavy vacuum residue containing high concentration of Conradson carbon (CCR), metals such as vanadium, nickel and sodium into lighter products, by employing an adsorbent to remove one or more of the impurities from the feedstock before the feedstock comes in contact with cracking catalyst.

Another object of the present invention is to provide an apparatus comprising a stripper cum separator to separate catalyst from the adsorbent, before regeneration step for eliminating adverse effects of vanadium (destruction of zeolite structure).

Yet another object of the present invention is to provide separated outlets for spent catalyst and adsorbent for regeneration.

Further object of the present invention is to provide a resid cracking apparatus with a stripper cum separator that handles the differences in the particle size and density of catalyst and adsorbent particles.

Yet another object of the present invention is to provide longevity to the catalyst, thereby increasing the production by lowering the cost.

Still, yet another object of the present invention is to provide a compatible design for said apparatus so that it can be used also with other FCC designs.

Another object of the present invention is to enhance the life of the apparatus by controlling the operating temperatures optionally by using catalyst coolers.

SUMMARY OF THE INVENTION

This invention provides for to a resid cracking apparatus comprising a riser, a reactor, a stripper cum separator, adsorbent/catalyst regenerators in flow communication with the stripper cum separator with interchangeable outlets depending upon the nature of catalyst and adsorbent, and a process thereof for converting hydrocarbon residues containing higher concentration of conradson carbon content, poisonous metals such as nickel & vanadium and basic nitrogen etc., into lighter and valuable products and a process thereof.

DETAILED DESCRIPTION OF THE INVENTION

In order to achieve the above-cited objects, the present invention provides a fluidized bed catalytic cracking apparatus, said apparatus (FIG. 2) comprising:

a riser (35) containing a feed stock, regenerated catalyst and adsorbent and having a first inlet means (31) for introduction of high velocity steam, a second inlet means (61) for introduction of the reactivated adsorbent, a third inlet means (32) for introduction of the feed stock containing heavy residual fractions with high concentrations of Conradson carbon content, metals including vanadium and nickel and additional poisons including nitrogen, a fourth inlet means (34) for introduction of the regenerated catalyst, an outlet (35A) of the riser is connected to riser termination devices/cyclones (39A, 39B, 40A and 40B) for causing separation of hydrocarbon vapors from adsorbent-catalyst mixture, the cyclones having dip legs extended towards stripper cum separator (37) drops catalyst-adsorbent mixture close to the interface of catalyst and adsorbent bed;

a reactor (38) comprising said cyclones and having an outlet (41) for taking out hydrocarbon vapors and steam mixture to fractionator(s);

a stripper cum separator (37) located at the bottom of the reactor for causing removal of strippable hydrocarbons from spent catalyst and coked adsorbent mixture and segregating catalyst from adsorbent;

said stripper cum separator is with or without baffles/internals having an inlet (36) at its base for introduction of steam in the upward direction so as to provide a superficial velocity sufficient to strip off all hydrocarbons and to segregate solids into two layers i.e., layer of spent catalyst (62) and another layer of coked adsorbent (63), an outlet at the bottom of the stripper cum separator for taking out coked adsorbent through a standpipe (52) via valve means (53), another outlet at an intermediate location above the said adsorbent outlet (52) for removing spent catalyst through a standpipe (42) via a valve means (43);

an adsorbent regenerator (54) located below the level of the lower portion of the stripper cum separator for receiving the coked adsorbent from the bottom portion of the stripper cum separator and causing reactivation of adsorbent thereof;

an inlet (59) in the adsorbent regenerator for introduction of air or oxygen containing gas or steam, an outlet (60) in flow communication with the third inlet (32) of the riser for introduction of reactivated adsorbent; and another outlet (57) at its top for the disposal of flue gas;

a catalyst regenerator (44) situated above the adsorbent regenerator but below the stripper cum separator is connected to the stripper cum separator by a stand pipe (42), an inlet (49) at the base of the regenerator for introducing air or oxygen containing gas for effectively burning coke deposited on the catalyst, an outlet (50) in flow communication with the fourth inlet of riser (34) via valve means (51) for introduction of regenerated catalyst; and another outlet (47) at its top for disposal of flue gas.

An embodiment of the present invention, wherein the outlets at the bottom and intermediate location of the stripper cum separator can be linked to the catalyst and the adsorbent regenerators respectively when the spent catalyst having particle size bigger and denser than that of the coked adsorbent.

Another embodiment of the present invention, wherein a fluidized bed catalytic cracking apparatus, said apparatus (FIG. 3) comprising:

a riser (5) containing a feed stock, regenerated catalyst and adsorbent and having a first inlet means (1) for introduction of high velocity steam, a second inlet means (2) for introduction of the reactivated adsorbent, a third inlet means (3) for introduction of the feed stock containing heavy residual fractions with high concentrations of Conradson carbon content, metals including vanadium and nickel and additional poisons including nitrogen, a fourth inlet means (4) for introduction of the regenerated catalyst, an outlet (5A) of riser is connected to riser termination devices/cyclones (9A, 9B, 10A, 10B) for causing separation of hydrocarbon vapors from adsorbent-catalyst mixture, cyclones having dip legs extended towards stripper cum separator (7) drops catalyst-adsorbent mixture close to the interface of catalyst and adsorbent bed;

a reactor (8) comprising said cyclones and having an outlet means (11) for taking out hydrocarbon vapors and steam mixture to fractionator(s);

a stripper cum separator (7) located at the bottom of the reactor for causing removal of strippable hydrocarbons from spent catalyst, and coked adsorbent mixture and segregating catalyst from adsorbent;

said stripper cum separator is with or without baffles/internals, an inlet means (6) at its base for introduction of steam in the upward direction so as to provide a superficial velocity sufficient to strip off all hydrocarbons and to segregate solids into two layers i.e., layer of spent catalyst (33) and another layer of coked adsorbent (32), an outlet means (12) at the bottom of the stripper cum separator for taking out spent catalyst through standpipe via valve means (13), another outlet means (22) at an intermediate location for removing coked adsorbent through stand pipe (22) via valve means (23);

an adsorbent regenerator (24) located below the level of the lower portion of the stripper cum separator for receiving the coked adsorbent from the intermediate location of the stripper cum separator and causing reactivation of the adsorbent thereof;

an inlet means (29) in the adsorbent regenerator for introduction of air or oxygen containing gas or steam, an outlet means (30) in flow communication with the second inlet means (2) of the riser for introduction of reactivated adsorbent via stand pipe (30), another outlet means (27) at its top for disposal of flue gas;

a catalyst regenerator (14) situated above the adsorbent regenerator is connected to stripper cum separator, an inlet (19) at the base of the regenerator for introducing air or oxygen containing gas for effectively burning coke deposited on the catalyst, an outlet (20) in flow communication with the fourth inlet (4) of riser for introduction of regenerated catalyst via slide valve (21) and an outlet means (17) at its top for disposal of flue gas.

Yet another embodiment of the present invention, wherein the particle size of the spent catalyst is smaller than that of coked adsorbent.

Still another embodiment of the present invention, wherein the cracking catalyst having a particle size in the range of 20–200 microns and a particle density in the range of 1.0–1.8 g/cc.

Further embodiment of the present invention, wherein the adsorbent having a particle size in the range of 200–500 microns and a particle density in the range of 1.5–3.0 g/cc.

Still another embodiment of the present invention, wherein the catalyst regenerator having two stage cyclones means (55 and 66) for separation of flue gas from adsorbent particles.

Yet another embodiment of the present invention, wherein the adsorbent regenerator having adsorbent cooler means (58) for removal of excess heat from adsorbent regenerator bed.

Still another embodiment of the present invention, wherein the catalyst regenerator having two stage cyclones means (45 and 46) for separation of flue gas from catalyst particles.

Yet another embodiment of the present invention, wherein a portion of the coked adsorbent is directly routed to the riser from stripper cum separator outlet (52) via stand pipes (60A) without undergoing reactivation step.

Still another embodiment of the present invention, wherein the particle size of the spent catalyst is bigger than that of the coked adsorbent.

Yet another embodiment of the present invention, wherein the cracking catalyst having a particle size in the range of 200–500 microns and a particle density in the range of 1.5–3.0 g/cc.

Further embodiment of the present invention, wherein the adsorbent having a particle size in the range of 20–200 microns and a particle density in the range of 1.0–1.8 g/cc.

Still another embodiment of the present invention, wherein a portion of the coked adsorbent is directly routed to the riser from stripper cum separator outlet (22) via stand pipes (30A) without undergoing reactivation step.

Yet another embodiment of the present invention, wherein stripping of entrained hydrocarbons from spent catalyst-coked adsorbent mixture and segregation of spent catalyst from coked adsorbent take place simultaneously in the stripper cum separator.

Further embodiment of the present invention, wherein the rising bubbles are the driving forces for particle segregation in the stripper cum separator.

Still another embodiment of the present invention, wherein the superficial gas velocity in stripper cum separator is in the range of 0.05–0.4 m/s, preferably in the range of 0.10–0.20 m/s for particle segregation.

Yet another embodiment of the present invention, wherein superficial velocity of the gas in the stripper cum separator varies within the range of ±20% of minimum fluidization velocity of larger and denser particles for ensuring fluidization and segregation.

Still another embodiment of the present invention, wherein the superficial velocity in the adsorbent regenerator is in the range of 0.5–2.0 m/s, preferably in the range of 0.8–1.5 m/s.

Yet another embodiment of the present invention, wherein 100% segregation of catalyst from adsorbent is achieved even within the prevailing operating conditions of conventional fluid catalytic cracking strippers.

Further embodiment of the present invention, wherein the difference in minimum fluidization velocity of smaller and lighter particles and those of larger and denser particles is used to achieve the desired segregation.

Still another embodiment of the present invention, wherein coked adsorbent that is separated from spent catalyst in stripper cum separator, is in reducing environment thereby eliminating adverse effects including the destruction of Zeolite structure of vanadium on the catalyst.

Further embodiment of the present invention, wherein the riser extends through stripper cum separator following the separation of hydrocarbon gas from catalyst-adsorbent mixture or an external riser.

Yet another embodiment of the present invention, wherein the mass flow rate of the adsorbent to the riser is such that the heat carried by the adsorbent is sufficient to vaporize heavy hydrocarbon feed stock and mass flow of adsorbent is in the range of 20–60wt % of total solids circulation.

Further embodiment of the present invention, wherein said adsorbent comprises micro spheres selected from a group consisting of calcined clay, calcined and crushed coke, magnesium oxide, silicia-alumina and a bottom cracking additive for selective removal of metals and feed CCR.

Yet another embodiment of the present invention, wherein said catalyst comprises catalysts selected from the group consisting of Rare earth exchanged Y zeolite, ultra stable Y zeolite, non-crystalline acidic matrix and other zeolites selected from type ZSM-5.

Still another embodiment of the present invention, wherein partial and controlled burning is performed in said adsorbent regenerator to prevent temperature excursions beyond 690° C. to enhance the life of the adsorbent.

Yet another embodiment of the present invention, wherein diplegs of riser termination devices/reactor cyclones are located at the interface of spent catalyst and coked adsorbent mixture in stripper cum separator.

Further embodiment of the present invention, wherein stripping of entrained hydrocarbons from spent catalyst-coked adsorbent mixture and segregation of spent catalyst from coked adsorbent simultaneously take place in stripper cum separator.

Yet another embodiment of the present invention, wherein said stripper cum separator is with or without baffles/internals.

Still another embodiment of the present invention, wherein the valve means provided on the stand pipes are slide valves.

The present invention also provides a Fluidized catalytic cracking process for converting hydrocarbon residues containing higher concentrations of Conradson carbon content, metals including nickel, vanadium, sodium and basic nitrogen into lighter products, wherein the particle size of the catalyst is smaller and lighter than the adsorbent, said process comprising the steps of;

a) contacting heavy residue feed stock with hot adsorbent, said adsorbent is lifted with steam from the riser bottom for such contact, to make the heavy residue feed, free from all contaminants;

b) contacting the feed depleted of contaminants with the catalyst at an intermediate location of the riser to cause catalytic cracking reaction;

c) transporting the vapor products, the spent catalyst and the coked adsorbent mixture to the riser top pneumatically;

d) separating the catalyst and the adsorbent from product hydrocarbon vapors in the riser termination device;

e) separating the spent catalyst and coked adsorbent in a stripper cum separator located below the reactor, at a low temperature, as two distinct layers of spent catalyst and coked adsorbent depending upon the particle size, density and differences in their minimum fluidization velocity, by using steam, so that heavier particles of coked adsorbent are settled at the bottom of the stripper cum separator and the lighter particles of spent catalyst are settled at the intermediate location of the stripper cum separator and all the strippable interstitial hydrocarbons are stripped off from the cracking catalyst and adsorbent mixture in said stripper cum separator;

f) introducing the coked adsorbent into adsorbent regenerator for partial or complete removal of coke by using air or oxygen containing gas for reactivation;

g) transporting the reactivated adsorbent into the riser;

h) transporting portion or full of coked adsorbent into the riser without reactivation;

i) introducing the spent catalyst into catalyst regenerator for partial or complete regeneration of catalyst using air, oxygen or oxygen containing gases; and j) transporting the regenerated catalyst into the riser;

Step (e) of the above-mentioned process is also be performed by separating the spent catalyst and coked adsorbent in a stripper cum separator located below the reactor, at a low temperature, as two distinct layers of spent catalyst and coked adsorbent depending upon the particle size, density and differences in their minimum fluidization velocity, by using steam, so that heavier particles of spent catalyst are settled at the bottom of the stripper cum separator and the lighter particles of coked adsorbent are settled at the intermediate location of the stripper cum separator and all the strippable interstitial hydrocarbons are stripped off from the cracking catalyst and adsorbent mixture in said stripper cum separator;

Yet another embodiment of the present invention, a process wherein the superficial velocity of steam in stripper cum separator is maintained in the range of 0.05–0.4 and preferably in the range of 0.10–0.20 m/s for efficient stripping and particle segregation. Still another embodiment of the present invention, a process wherein the superficial velocity in the adsorbent regenerator & catalyst regenerator is maintained within 0.5–2.0 m/s and preferably within 0.8–1.5 m/s.

Yet another embodiment of the present invention, a process wherein said adsorbent is calcined coke for heavy feed stock containing Conradson Carbon content (CCR) in the range of 8 wt %-20 wt %

Still another embodiment of the present invention, a process wherein the separation of spent catalyst and coked adsorbent is done in stripper cum separator in the absence of Oxygen, at a low temperature in the range of 450–600° C., thereby preventing Vanadium mobility from adsorbent to catalyst.

Yet another embodiment of the present invention, a process wherein the preferred adsorbent for residue feed containing a very high CCR above 8 wt % is calcined petroleum coke having good attrition resistance.

Still another embodiment of the present invention, a process wherein withdrawing net coke stream from the adsorbent regenerator especially while processing residual oils containing CCR above 8-wt %.

Yet another embodiment of the present invention, a process wherein a net stream of coked adsorbent is withdrawn from the system to maintain heat balance easily with high Conradson Coke content up to 20-wt %.

Further embodiment of the present invention, a process wherein the air is maintained to achieve total combustion in catalyst regenerator and the coke on regenerated catalyst is preferably less than 0.1 wt %, resulting in control of regenerator temperature within the range of 730–750° C.

Still another embodiment of the present invention, a process wherein coked adsorbent from the stripper can be recycled directly without undergoing reactivation.

Yet another embodiment of the present invention, a process wherein the residue feed stock comprising a very high CCR to the extent of 20 wt % of feed is processed without violating the overall heat balance of the unit and not resorting to catalyst cooling.

Yet another embodiment of the present invention, a process wherein Conradson coke and metal laden adsorbent can be withdrawn as separate stream from the stripper cum separator or from adsorbent cum catalyst regenerators, such adsorbent containing metals as high as 35,000 ppm for the extraction of high value Vanadium and nickel from the adsorbent.

Further embodiment of the present invention, a process wherein the adsorbent is selected from the group consisting of magnesia, silica magnesia, kaolin clay, alumina silica alumina and a mixture thereof having acidic and non-acidic properties.

Yet another embodiment of the present invention, wherein said process handles up to 40 PPM of nickel on feed.

Still another embodiment of the present invention, wherein said process handles up to 15000 PPM of nickel on equilibrium catalyst.

Further embodiment of the present invention, wherein said process handles vanadium on feed up to 60 PPM.

Yet another embodiment of the present invention, wherein said process handles vanadium up to 20000 PPM on equilibrium catalyst.

Still another embodiment of the present invention, a process wherein the total residence time from the adsorbent entry point to catalyst entry point in the riser bottom section is in the range of 10–40% of the total riser residence time.

Yet another embodiment of the present invention, a process wherein the catalyst residence time in the riser is maintained between 1–15 seconds and preferably between 3–8 seconds depending on the severity of the operation.

The present invention is further described in the form of the following preferred embodiments.

Adsorbent

Adsorbent particles are intended to adsorb the CCR, the poisonous metals e.g. vanadium, nickel etc., basic nitrogen and sulfur rich compounds existing in enriched form in the residual hydrocarbon fractions. Typically, adsorbent particles are having particle size in the range of 200–500 microns but preferably within 300–400 microns. The particle density is between 1.5–3.0 g/cc and preferably 1.8–2.6 g/cc and most preferably 2.3–2.5 g/cc. The present system also supports when the particle size of adsorbent smaller than the particle size of the catalyst.

The adsorbent particles mainly consist of the microspheres composed of alumina, silica, magnesia, silica alumina, silica magnesia, kaolin clay or a mixture there off having acidic properties or totally non-acidic. These micro spheres are prepared using the conventional art of FCC catalyst preparation i.e., by preparing the solution of desired chemical composition, its spray drying and calcination. Typically, these materials have very less acidic cracking activity characterized by MAT activity of less than 15 and surface area less than 5 $m^2/g$. However, the present invention is not limited to low activity adsorbent alone. For example, one may use the disposable spent catalyst from FCC/Residue FCC or hydro-processing units, provided particle size and density are within the specified range of the adsorbent as mentioned above. More details on the above said materials are available in U.S. Pat. Nos. 5,059,302 and 6,148,975.

For residues containing CCR above 8 wt %, it is preferred that the adsorbent should be calcined petroleum coke produced from calcination of raw coke generated in the delayed coking process of petroleum residues. Coal particles or other types of coke are also applicable but calcined coke is preferred due to its excellent attrition resistance and physical properties.

Typical properties of calcined petroleum coke is given below:

| Description | % wt |
|---|---|
| Ash content | 0.17 |
| Sulfur | 1.04 |
| Volatile matters | 0.33 |
| Iron | 149 ppm |
| Vanadium | 3.8 ppm |
| Real density | 2.14 g/cc |
| Bulk density | 0.73 g/cc |
| Particle density | 1.52 g/cc |
| Attrition resistance | 1.2 Division Index |

Typical particle size distribution of the adsorbent particles are given below:

| Wt % below | Adsorbent Particle Size (microns) |
|---|---|
| 0 | 210 |
| 10 | 230 |
| 30 | 250 |
| 50 | 270 |
| 70 | 290 |
| 90 | 310 |
| 95 | 320 |
| 100 | 350 |

More details on adsorbent are discussed in U.S. Pat. Nos. 4,944,865 & 6,149,875. The adsorbent particles preferably should be micro spherical in nature. However, the present invention is not limited to micro spherical form only.

Catalyst

Conventional state of the art commercial catalyst used in resid FCC technology is also employed in this invention. However, the present invention specifically describes the particle size of the catalyst to be within 20–200 microns and more preferably 20–170 microns and most preferably 20–120 microns. Similarly, the particle density may be within 1.0–1.8 g/cc and more preferably 1.3–1.6 g/cc and most preferably within 1.3–1.5 g/cc to obtain best results as disclosed in the present invention. Like adsorbents, catalyst should be preferably micro-spherical in shape. The present invention is not restricted to spherical type of FCC catalyst particles. Rare earth exchanged Y zeolite, Ultrastable Y zeolite, non-crystalline acidic matrix and even other zeolites e.g. shape selective ZSM-5 zeolite may also be used. The present system also supports when the particle size of the catalyst is bigger than that of the particle size of the adsorbent.

Typical particle size distribution of the catalyst micro spheres is:

| Wt % below | Catalyst Particle Size, Microns |
|---|---|
| 0 | 20 |
| 10 | 40 |
| 30 | 70 |
| 50 | 80 |
| 70 | 95 |
| 90 | 105 |
| 95 | 110 |
| 100 | 120 |

Feedstock

The present invention provides a novel approach to handle residual hydrocarbons having higher CCR, metals and other poisons. Maximum benefit is obtained particularly if the metal level and CCR level of the feed are above 10 ppm and 5 wt % on feed respectively. Here, metal includes vanadium and nickel. It may be noted that our invention preferentially allow the CCR, metals and other poisons of the feed to deposit on the adsorbent first before contacting with the catalyst. Moreover, a net stream of coked adsorbent is withdrawn from the system, which helps to maintain heat balance quite easily for feedstock with high CCR (up to 20 wt %).

Catalyst Regenerator

The catalyst withdrawn from stripper is transported through standpipe to catalyst regenerator. In the present invention, the superficial velocity in catalyst regenerator is maintained typically within 0.5–2.0 m/s and more preferably within 0.8–2.0 m/s to have a conventional dense bed regeneration of the catalyst. However, the present invention is also applicable to fast fluidized combustor or even two stage regenerator designs.

The air is maintained such that preferably total combustion is achieved and the coke on regenerated catalyst is preferably less than 0.1 wt % keeping the regenerator temperature within 730–750° C. Since the feed CCR and metals are preferentially deposited on the adsorbent particles, we do not expect too much coke lay down on the catalyst. However, catalyst cooler may also be employed in the present invention where the regenerator temperature is to be restricted within 730° C. for achieving desired catalyst to oil ratio in riser.

Adsorbent Regenerator

The adsorbent regenerator usually runs in the partial combustion mode under controlled airflow in dense bed fluidization regime. The coke burnt from the adsorbent is sufficient to maintain the dense bed temperature within 700° C. and most preferably within 680° C. The excess oxygen in the flue gas could be in the range of 0–2-vol % and $CO/CO_2$ may vary in the range of 0.2–20 vol/vol. There is no maximum limit on the coke on the adsorbent. Usually, it is observed that at higher concentration of coke on the adsorbent, the vanadium and CCR trapping ability of the adsorbent improves. However, for practical reasons, the coke content on the adsorbent is kept in the range of 0.3–2.0-wt %.

There is provision to withdraw a net stream of adsorbent from the regenerator when the residue contains feed CCR above 8-wt % and the preferred adsorbent in such case is calcined coke. This helps to process higher CCR feed without violating the heat balance. The flue gas of the adsorbent regenerator is either mixed with the flue gas of catalyst regenerator or sent directly to CO boiler or energy recovery section.

Riser

In this section, the adsorbent particles coming from adsorbent regenerator are first contacted with preheated heavy residual hydrocarbon feed in presence of lift steam. Typically, lift and feed atomization steam of about 10–50 wt % of feed may be added in the bottom section of the riser depending on the quality of residue particularly CCR content. The superficial velocity is maintained in the range of 6–10 m/s typically, which will be sufficient to lift the adsorbent particles through the riser.

The regenerated catalyst is injected at the intermediate elevation of the riser. The ratio of catalyst to total hydrocarbon is kept normally in the range of 4–6 wt/wt to achieve best possible results. There is provision for injecting separate feed stream at the intermediate riser elevation above the entry point of the regenerated catalyst. Such feed should contain CCR, metals and other poisons as less as possible but definitely lower than those of the residual stream injected at the riser bottom. Typical example of such cleaner streams are fresh vacuum gas oil, heavy cycle oil etc. The riser top temperature and the intermediate temperature just below the catalyst entry point is used to control catalyst/oil and adsorbent/residue ratios respectively through the corresponding slide valve. Total residence time in the riser bottom section (adsorbent entry point to catalyst entry point) could be 10–40% of the total riser residence time. The catalyst residence time in the riser is maintained between 1–15 seconds and preferably between 3–8 seconds depending on the severity of the operation desired.

Stripper Cum Separator

The spent catalyst and coked adsorbent mixture enters the stripper cum separator at a location near the interface of the catalyst/adsorbent layer. In the present invention, stripper acts as a separator to segregate catalyst from adsorbent and also has conventional FCC stripper to strip off all interstitial hydrocarbons from catalyst/adsorbent. The principle of difference in minimum fluidization velocity between catalyst and adsorbent is exploited for achieving the segregation in stripper.

Stripping steam may be injected at the bottom of the stripper cum separator and/or at different elevations to achieve better stripping efficiency. Usually, 1.5–5 tons per 1000 tons of solid flow is the normal ratio of total steam flow in the stripper. In the present invention, the superficial velocity of stripping gas is maintained in the range of 0.1–0.4 m/s. However, it is preferred to maintain higher velocity of the stripping gas typically above 0.15 m/s, which is close to the minimum fluidization velocity of denser particles for ensuring better segregation & stripping. Specially, in the standpipes and at the bottom of the stripper, steam purge is given to keep the adsorbent and the catalyst mixture in fluidized state. In contrast to the conventional strippers, stripper without baffles/internals is preferred in the present invention considering practical issues such as generation of desired gravity head particularly for pushing catalyst/adsorbent towards regenerator, better segregation efficiency, overall pressure balance etc. However, stripper with baffles/internals is well within the scope of the present invention.

BRIEF DESCRIPTION OF THE ACCOMPANIED DRAWINGS

FIG. 1 of the prior art represents prior art FCC apparatus with two stage regenerators, riser reactor with single stage annular stripper and where the entry of solid particles is at a single point in the riser.

FIG. 1 of the prior art represents a prior art with two separate dense bed regenerator vessels.

Regenerator 1 of FIG. 1 receives spent catalyst from stripper 4. Combustion air 5 in the regenerator 1 is distributed at the bottom and catalyst dense phase 6 is maintained typically in partial combustion conditions at which the coke on the catalyst is partially burnt off using controlled amount of air at moderate temperature. The flue gas of regenerator 1 is separated from the entrained catalyst by cyclone 7 or a series of cyclones. The partially regenerated catalyst is lifted from regenerator 1 to regenerator 2 via lift line 9 by using lift air 8 and plug valve 10. Secondary air 11 is introduced at the bottom of regenerator 2 such that the dense bed 12 is maintained and the catalyst is completely burnt off the coke to the extent of 0.1 wt %. The flue gas from regenerator 2 is separated from the entrained catalyst using series of cyclones 14 & 15 and discharged through outlet 16. The regenerated catalyst is withdrawn from line 13A having pressure equalizer 13B and fed to an entry 18 at the bottom of riser 3. Lift steam is introduced from inlet 17 of the riser 3 for pre-accelerating the catalyst. Hydrocarbon feed is injected at an entry 19 and the mixture of hydrocarbon and catalyst flow through the riser 3 where the cracking reaction take place, the majority of hydrocarbon vapors are separated from the said mixture in riser termination devices 20A & 20B. The interstitial hydrocarbons present in catalyst are stripped off in stripper 4 with steam entering at 21. The stripped spent catalyst is sent to the regenerator 1 through the standpipe 25 for continuous regeneration and circulation. The product hydrocarbons are further separated from the entrained catalyst fines using cyclones 22A & 22B in reactor 23 before directing the product vapors to the fractionator via transfer line 24.

Figure 2:
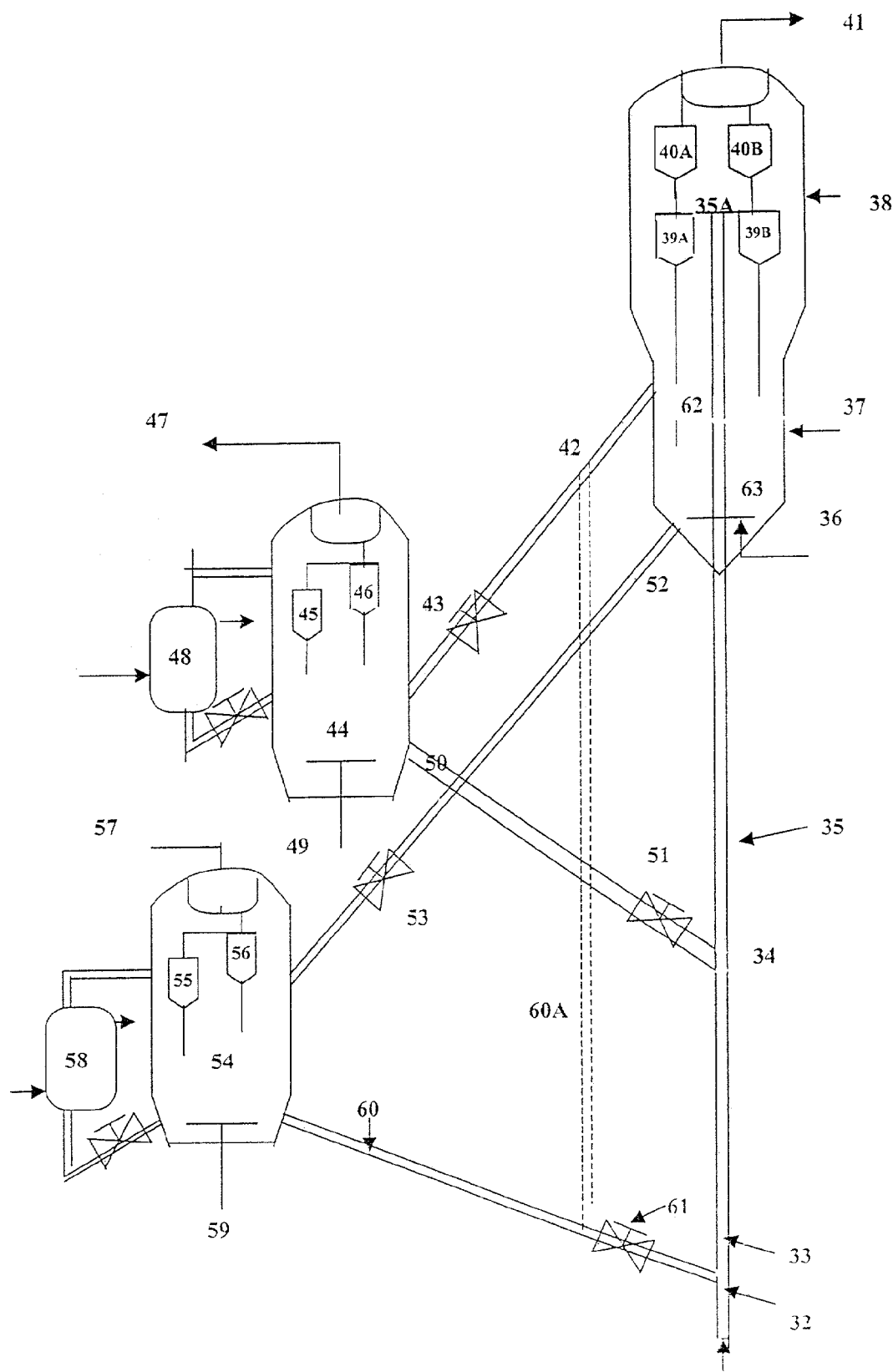

FIG. 2 illustrates the FCC apparatus of the present invention where in stripper cum separator 37 is employed to perform dual function firstly as conventional stripper and secondly as separator device to separate catalyst from adsorbent using steam 36 as a stripping/fluidizing media. The superficial velocity of steam in stripper cum separator 37 is maintained in such a way that two distinctly different layers i.e. a layer of catalyst 62 and another layer of adsorbent 63 are formed in stripper cum separator 37. The adsorbent layer 63 of stripper bed is taken to adsorbent regenerator 54 via coked adsorbent standpipe 52 and adsorbent flow is controlled through slide valve 53. Coked adsorbent is regenerated introducing oxygen containing gas or air or steam 59. Superficial velocity of gas is maintained in adsorbent regenerator 54 in such a way that turbulent regime of operation is possible. Entrained adsorbent particles are separated from flue gas via cyclones 55 & 56. Flue gas is taken out for further treatment through flue gas line 57 where as adsorbent particles separated are dropped to adsorbent bed via cyclones 55 & 56 diplegs. An adsorbent cooler 58 is provided with adsorbent regenerator 54 for extracting excess heat produced. This will help in minimizing damaging effects of vanadium in high temperature and steam environment. Reactivated adsorbent is transported to riser bottom entry 32 through reactivated adsorbent standpipe 60. Flow of this adsorbent is controlled through slide valve 61. Reactivated adsorbent is lifted up in the riser 35 using lift steam 31 entering right at the bottom of the riser 35. Steam 31 will facilitate to achieve fully developed flow of reactivated adsorbent before it comes in contact with heavy residue feed entering at a location 33 above adsorbent entry point 32. As soon as heavy residue feed 33 comes in contact with reactivated adsorbent, feed gets vaporized and subsequently feed contaminants such as Nickel, Vanadium, and Conradson carbon content (CCR) etc. are deposited on adsorbent while feed and adsorbent are transported upwards in the riser 35. Similarly, catalyst layer 62 of stripper bed is transported to catalyst regenerator 44 via spent catalyst standpipe 42 and the catalyst flow is controlled through slide valve 43. Spent catalyst is regenerated in catalyst regenerator 44 by introducing oxygen containing gas or air through the inlet 49, which also causes catalyst fluidization and proper mixing. Entrained catalyst is separated in cyclones 45 and 46 provided in the dilute bed of regenerator 44. Catalyst is retained in regenerator and flue gas is taken out through flue gas line 47. A catalyst cooler 48 is provided to cool down the temperature of catalyst, if required. Catalyst cooler 48 is a conventional one adopted in FCC units. Regenerated catalyst is sent to an intermediate entry 34 of riser 35 through regenerated catalyst standpipe 50 by controlling catalyst flow through slide valve 51. By the time mixture of feed and adsorbent comes in contact with regenerated catalyst entering at a location 34 in riser 35, feed is almost free from all the contaminants. From entry point 34 in the riser 35 onwards, cracking reaction takes place and the feed, catalyst and adsorbent mixture is pneumatically conveyed to the riser top. Product and unconverted hydrocarbon vapors are separated from spent catalyst and coked adsorbent through the riser termination devices 39A & 39B provided at the top end of the riser 35. Spent catalyst-coked adsorbent mixture is brought to the stripper via dip leg of termination devices 39A & 39B. Fine particles of spent catalyst and coked adsorbent carried along with hydrocarbon vapors to the reactor 38 are separated using cyclones 40A & 40B. The diplegs of 39A, 39B, 40A & 40B are terminated close to spent catalyst and coked adsorbent bed interface in stripper cum separator 37. As described above, spent catalyst and coked adsorbent mixture collected in stripper cum separator 37 is separated in to two layers 62 & 63 and taken to respective regenerators 44, & 54 for regeneration/reactivation. The cycle of regeneration, feed contaminants removal, cracking reaction followed by gas-catalyst-adsorbent separation and then separation of spent catalyst from coked adsorbent is continued. Though it is not shown in FIG. 2, riser 35 employed in the present invention may also be located externally. In such situation, the cyclones are connected to the riser 35 top and the diplegs of these cyclones are connected to stripper cum separator 37 at the interface of catalyst-adsorbent bed.

The present invention also includes recycling of coked adsorbent 63 separated in stripper cum separator 37 directly to riser entry 32 without under going regeneration step via recycle adsorbent stand pipe 60(A) and slide valve 61 is used to control coked adsorbent flow to riser entry 32. Other wise, instead of oxygen containing gas or air, steam is used in adsorbent regenerator 54 for the purpose of keeping fluidization conditions required. This provision is very helpful when calcined petroleum coke is used as an adsorbent. Though not indicated in FIG. 2 there is a provision for adding or withdrawing adsorbent and catalyst to/from catalyst regenerator 44 and adsorbent regenerator 54.

Figure 3:
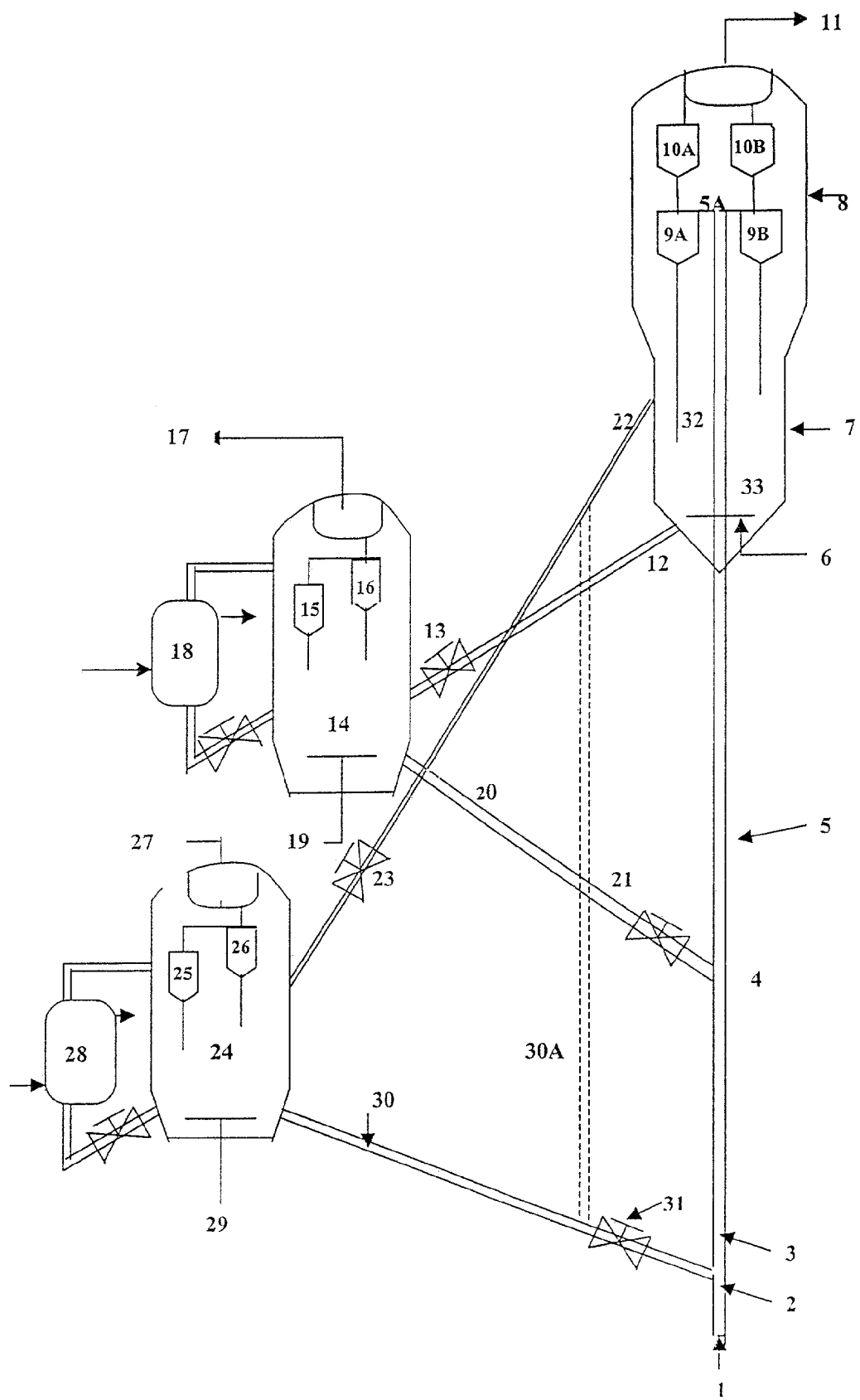

FIG. 3 illustrates the FCC apparatus of the present invention wherein stripper cum separator (7) is employed to perform dual functions, firstly as a conventional stripper and secondly as a separator device to separate catalyst from adsorbent using steam (6) as a stripping/fluidizing media. The superficial velocity of steam in stripper cum separator (7) is maintained in such a way that two distinctly different layers (depending upon the particle size/density of catalyst and adsorbent) i.e. a layer of catalyst and another layer of adsorbent (33 and 32) are formed in stripper cum separator (7).

The said catalyst/adsorbent layers (33 and 32) of stripper bed are taken to catalyst/adsorbent regenerators (14 and 24) via stand pipes (12 and 22) respectively and the flow of catalyst/adsorbent is controlled by slide valves (13 and 23) respectively. Coked adsorbent/spent catalyst is regenerated in regenerators (24 and 14) by introducing oxygen-containing gas or air or steam through inlets (29 and 19) respectively. Superficial velocity of gas is maintained in said adsorbent/catalyst regenerator in such a way that turbulent regime of operation is possible. Entrained catalyst/adsorbent particles are separated by cyclones (15, 16 and 25, 26) respectively provided in the dilute bed of regenerators (14 and 24). Catalyst is retained in regenerator and flue gas is taken out through respective flue gas lines (17 and 27). Catalyst coolers (18 and 28) are provided to cool down the temperature generated in the regenerators, if required. Catalyst coolers (18 and 28) are conventional ones that are provided to adsorbent and catalyst regenerators (24 and 14) respectively for extracting excess heat produced. This will help in minimizing damaging effects of vanadium in high temperature and increasing the catalyst or adsorbent circulation rate. Flue gas is taken out for further treatment through flue gas lines (17 and 27) respectively.

Regenerated catalyst is transported to the riser entry (4) via stand pipe (20) that is in flow communication with the regenerator (14).

Reactivated adsorbent is transported to the riser entry (2) via stand pipe (30) that is in flow communication with adsorbent regenerator (24).

Regenerated catalyst flow is controlled by slide valve (21).

Reactivated adsorbent flow is controlled by slide valve (31).

Adsorbent is also transported directly into the riser (5) without reactivation via standpipe (30A).

Reactivated adsorbent is lifted up in the riser (5) using lift steam (1) entering right at the bottom of the riser (5). Steam (1) will facilitate to achieve a fully developed flow of adsorbent before it comes into contact with heavy residue feed (3) entering at location of the riser above the adsorbent entry point (2).

As soon as heavy residue feed (3) comes in contact with the reactivated adsorbent, feed gets vaporized and subsequently feed contaminants such as Nickel, Vanadium and Conradson carbon content (CCR) etc. are deposited on adsorbent while feed and adsorbent are transported upwards in the riser (5) pneumatically.

Regenerated catalyst is transported to the riser entry (4) via stand pipe (20) that is in flow communication with catalyst regenerator (14). From entry point (4) in the riser (5) onwards, cracking reaction takes place in presence of catalyst and the feed, catalyst and adsorbent mixture is pneumatically conveyed to the riser top. Product and unconverted hydrocarbon vapors are separated from spent catalyst and coked adsorbent through the riser termination devices (9A and 9B) provided at the top end (5A) of the riser (5). Spent catalyst and coked adsorbent mixture is brought to the stripper via dip leg of termination devices (9A and 9B) respectively. Finer particles of spent catalyst and coked adsorbent carried along with hydrocarbon vapors to the reactor (8) are separated using cyclones (10A and 10B) respectively. The diplegs of cyclones (9A, 9B, 10A and 10B) are terminated close to spent catalyst and coked adsorbent bed interface in stripper cum separator (7). As described above, spent catalyst and coked adsorbent mixture collected in stripper cum separator (7) is separated into two layers that is the upper layer of adsorbent (32) and lower layer of catalyst (33) and are taken to respective regenerators (24 and 14) for reactivation/regeneration respectively. The cycle of regeneration/reactivation, feed contaminants removal, cracking reaction followed by gas-catalyst-adsorbent separation and then separation of spent catalyst from coked adsorbent and transportation of coked adsorbent and spent catalyst to the respective regenerators is continued. Though it is not shown in FIG. 3, riser (5) employed in the present invention may also be located externally. In such situation, the cyclones are connected to the top end (5A) of the riser (5) and the diplegs of these cyclones are connected to stripper cum separator (7) at the interface of catalyst and adsorbent bed.

Although not shown in accompanying drawings (FIG. 2 & FIG. 3), a combination of apparatus shown in FIG. 2 and FIG. 3 is also within the scope of present invention, wherein the outlets of the stripper cum separator that are in flow communication with catalyst and adsorbent regenerators can be suitably modified depending upon the physical properties (size & density) of catalyst & adsorbent.

The present invention is further illustrated in the form of following examples in non-limiting way to better understand the invention.

EXAMPLE 1

This example illustrates the relationship between superficial gas velocity and segregation efficiency in the said apparatus. Two types of particles i.e. sand of particle size in the range of 210–350 microns with particle density of 2.6 g/cc and catalyst of size in the range of 40–150 microns with particle density of 1.45 g/cc are used in this study.

The apparatus is a circulating fluidized bed system consisting of a riser of diameter 6" and of length 280", having two stage cyclone system for gas-solid separation and a separator vessel of diameter 20" ID and length of 100" with a provision for introduction of gas through distributor from its base and an entry for receiving catalyst-sand mixture, an outlet for taking out the catalyst via upper stand pipe having flow communication with intermediate location in the riser, containing another outlet for sand withdrawal at the bottom of separator vessel and having connected to riser via lower stand pipe.

The sequence of operation is continued till a steady state is reached and then solid samples are collected at different locations along the length of the separator. These samples are analyzed for particle size distribution to establish the amount of segregation that has taken place. For 100% segregation efficiency, the collected samples should contain no particles of size below 210 microns i.e. the minimum cut size of the sand employed in this study. Following results are obtained for the gas superficial velocity in the range of 0.1 to 0.4 m/s with a total inventory of 260 kg in the ratio of 50:50 (catalyst and sand).

| Sup. Gas Velocity, m/s | Segregation Efficiency, % | Observation |
| --- | --- | --- |
| ≤0.03 | — | No fluidization of sand particles |
| 0.05 | 100 | Rare movement of sand, two different layers of catalyst and sand seen. |
| 0.07 | 100 | Slight movement of sand and catalyst but still two layers are formed |
| 0.12 | 100 | Continuous movement of sand and catalyst but still two layers are formed |
| 0.15 | 100 | Rigorous movement of sand and catalyst and two distinctly different layers are formed |
| 0.22 | 65–70 | Considerable bubbling and mixing |
| >0.30 | 50 | Rigorous bubbling and mixing |

There was no fluidization and segregation of particles when the superficial velocity of gas was less than 0.03 m/s. 100% segregation is achieved with superficial gas velocity ranging from 0.05 to 0.20 m/s. However, superficial velocity beyond 0.3 m/sec leads to rigorous bubbling and mixing. It is apparent from the above study that there is an optimum superficial velocity of gas at which 100% segregation is possible and also fluidization condition is maintained. It is interesting to see that all conventional FCC strippers operate with superficial velocity of gas in the range of 0.1 to 0.3 m/s. In the present invention, stripper performs its function to remove strippable hydrocarbons and also facilitate segregation of solids within the same domain of operation. Reduction in segregation efficiency beyond 0.3 m/s is due to rigorous bubbling and mixing of catalyst and sand particles.

From the above study, it is observed that rising bubbles are the driving force for particle segregation, facilitating movement of larger and denser sand particles preferentially towards bottom of the separator through the temporarily disturbed region i.e. voids created behind the bubbles. Similarly the up flow in the bubble wake (roof of the bubble) is causing smaller and lighter particles to reach top portion of the bed.

Normally particle segregation occurs if the superficial velocity of the gas in the vessel is maintained close to the minimum fluidization velocity of the larger and denser particle present in the vessel. It is interesting to see in the table given below that the minimum fluidization velocity of the sand particles in the size range of 210–350 microns employed in the present study is in the range of 0.06–0.12 m/s. Incidentally, 100% segregation efficiency is achieved corresponding to superficial gas velocity in the range of 0.05 to 0.15 m/s, which is on average, equivalent to minimum fluidization velocity of sand particles. Hence, in the present invention, the differences in minimum fluidization velocities between sand and catalyst particles are exploited to maximize the segregation efficiency.

| Material → | Sand | | | | Catalyst |
| --- | --- | --- | --- | --- | --- |
| APS, microns | 180 | 280 | 325 | 425 | 95 |
| Min. Fluid Velocity, m/s | 0.04 | 0.06 | 0.10 | 0.15 | 0.004 |

To sum up, the conditions prevailing in conventional FCC strippers would cause stripping as well as particle segregation within the operating window. This example also highlights that driving force caused by rising bubbles leads to sand and catalyst segregation.

EXAMPLE 2

This example illustrates the benefits of sequential dual solid processing particularly the vanadium deposition preferentially on the adsorbent particles and thereby improving the activity of the FCC catalyst.

For this purpose following samples are considered.

Catalyst-A Commercially available ReUSY (rare earth exchanged ultra stable Y) based FCC catalyst sample.

Adsorbent-B V-trap commercial additive with particle size in the range of 250–350 micron.

Vanadium is first deposited (by adopting pore volume impregnation route of Mitchell) at 0 and 10,000 ppm on the mixture of catalyst A and adsorbent B, mixed in the ratio of 10:0.6.

Typically, the MAT activity was determined using MAT (micro activity test) at 510° C. reactor temperature, 2.5 grams solid loading, 30 seconds feed injection time and varying feed rate to generate data at different conversion levels. Feed used is the combined feed used in one commercial FCC unit with CCR 0.4 wt %, boiling range 370–550° C., density of 0.91 g/cc.

There after, the Vanadium is deposited selectively on the adsorbent B at 0,10000 ppm using the same pore volume impregnation technique. The metal laden adsorbent is then mixed with the catalyst A in the same ratio of 0.6:10. MAT activity and product selectivity were measured using the same feed with this solid mixture as performed in above.

For the sake of comparison, MAT studies were also done with only Catalyst A (without adding any adsorbent), both at 0 and 10000 ppm vanadium level.

Following results are obtained:

Mat Activity

Mat activity is defined as the conversion obtained at WHSV of 110 hour$^{-1}$ and conversion is defined as the wt % product boiling below 216° C. including coke.

| Vanadium level, ppm | Catalyst A | Vanadium deposited on Composite Catalyst & Adsorbent | Vanadium deposited only on Adsorbent |
| --- | --- | --- | --- |
| 0 | 38.6 | — | — |
| 10,000 | 10.1 | 16.5 | 37.5 |

Coke Selectivity

Similarly, the coke selectivity changes with vanadium are given below, with both combined as well as sequential processing of solid. Here, coke selectivity is defined as the coke yield (wt % of feed) at 38 wt % conversion level.

| Vanadium level, ppm | Catalyst A | Vanadium deposited on Composite Catalyst & Adsorbent | Vanadium deposited only on Adsorbent |
|---|---|---|---|
| 0 | 1.87 | — | — |
| 10,000 | 5.93 | 3.62 | 1.9 |

It is observed here that if no adsorbent is used, vanadium at 10,000 ppm concentration, brings down the conversion very significantly from 38.6 to 10.1 unit, which improves to 16.5 when the adsorbent is used combined in the catalyst. However, when sequential vanadium deposition is done first on the adsorbent before mixing with the catalyst, the solid mixture shows almost the same conversion as if no vanadium is there. Similar case is observed on the coke selectivity also. Sequential vanadium deposition on the adsorbent first is able to provide coke selectivity almost same as that of the catalyst without vanadium.

From the above, the importance and advantage of first depositing vanadium selectively on the adsorbent is clearly observed. There has been remarkable retention of the catalyst activity, coke and other product selectivity if the Vanadium is preferentially deposited on the adsorbent first before getting in contact with the actual catalyst.

Advantages

The following are the main advantages of the present invention.

1. The separation of spent catalyst and coked adsorbent is done at low temperature in absence of any oxygen containing gas. At this condition, there is no chance of vanadium mobility from the adsorbent to the catalyst phase thereby eliminating catalyst deactivation due to metal poisoning.
2. The adsorbent contacts first with the residue hydrocarbons at the riser bottom before contacting the cracking catalyst and captures most of the feed contaminants such as Nickel, vanadium and CCR present in the residue and thereby improving the activity and life of catalyst. This greatly improves the capability of handling very heavy residue feed economically and effectively. These results in enhancing the overall performance of the catalyst and also to bring down catalyst make up rate.
3. The CCR and metal laden adsorbent can be withdrawn as separate stream from the stripper cum separator or from adsorbent regenerator. Such adsorbent may contain metals as high as 50,000 PPM, which could be used for extracting the high value vanadium and nickel from the adsorbent.
4. In addition, if the residue feed contains very high CCR (above 8 wt %), any state of the art FCC process, will require enormous catalyst cooling to avoid the higher regenerator temperature. In contrast, our invention takes care of very high CCR containing residue quite efficiently. The adsorbent captures most of the feed CCR (about 90%) in the riser bottom. In such cases of high feed CCR, the preferred adsorbent is calcined petroleum coke. Such withdrawn coke stream could be used as feed for coke gasification/power or steam generation inside or outside the refinery. This unique feature of our invention allows the flexibility to process residue with very high CCR (as high as 20 wt % of feed) without violating the overall heat balance of the unit.

The invention claimed is:

1. A fluidized bed catalytic cracking apparatus, said apparatus comprising:

a riser (35) containing a feed stock, regenerated catalyst and adsorbent and having a first inlet means (31) for introduction of high velocity steam, a second inlet means (61) for introduction of the reactivated adsorbent, a third inlet means (32) for introduction of the feed stock containing heavy residual fractions with high concentrations of conradson carbon content, metals including vanadium and nickel and additional poisons including nitrogen, a fourth inlet means (34) for introduction of the regenerated catalyst, an outlet (35A) of the riser is connected to riser termination devices/cyclones (39A, 39B, 40A and 40B) for causing separation of hydrocarbon vapors from adsorbent-catalyst mixture, the cyclones having dip legs extended towards stripper cum separator (37) drops catalyst-adsorbent mixture close to the interface of catalyst and adsorbent bed;

a reactor (38) comprising said cyclones and having an outlet (41) for taking out hydrocarbon vapors and steam mixture to fractionator(s);

a stripper cum separator (37) located at the bottom of the reactor for causing removal of strippable hydrocarbons from spent catalyst and coked adsorbent mixture and segregating catalyst from adsorbent;

said stripper cum separator is with or without baffles/internals having an inlet (36) at its base for introduction of steam in the upward direction so as to provide a superficial velocity sufficient to strip off all hydrocarbons and to segregate solids into two layers a, layer of spent catalyst (62) and another layer of coked adsorbent (63), an outlet at the bottom of the stripper cum separator for taking out coked adsorbent through a standpipe (52) via valve means (53), another outlet at an intermediate location above the said adsorbent outlet (52) for removing spent catalyst through a standpipe (42) via a valve means (43);

an adsorbent regenerator (54) located below the level of the lower portion of the stripper cum separator for receiving the coked adsorbent from the bottom portion of the stripper cum separator and causing reactivation of adsorbent thereof;

an inlet (59) in the adsorbent regenerator for introduction of air or oxygen containing gas or steam, an outlet (60) in flow communication with the second inlet (32) of the riser for introduction of reactivated adsorbent; and another outlet (57) at its top for the disposal of flue gas;

a catalyst regenerator (44) situated above the adsorbent regenerator but below the stripper cum separator is connected to the stripper cum separator by the stand pipe (42), an inlet (49) at the base of the regenerator for introducing air or oxygen containing gas for effectively burning coke deposited on the catalyst, an outlet (50) in flow communication with the fourth inlet of riser (34) via valve means (51) for introduction of regenerated catalyst; and another outlet (47) at its top for disposal of flue gas.

2. The apparatus according to claim 1, wherein the outlets at the bottom and intermediate location of the stripper cum separator can be linked to the catalyst and the adsorbent regenerators respectively when the spent catalyst having particle size bigger and denser than that of the coked adsorbent.

3. A fluidized bed catalytic cracking apparatus, said apparatus comprising:

a riser (5) containing a feed stock, regenerated catalyst and adsorbent and having a first inlet means (1) for introduction of high velocity steam, a second inlet means (2) for introduction of the reactivated adsorbent, a third inlet means (3) for introduction of the feed stock containing heavy residual fractions with high concentrations of conradson carbon content, metals including vanadium and nickel and additional poisons including nitrogen, a fourth inlet means (4) for introduction of the regenerated catalyst, an outlet (5A) of riser is connected to riser termination devices/cyclones (9A, 9B, 10A, 10B) for causing separation of hydrocarbon vapors from adsorbent-catalyst mixture, cyclones having dip legs extended towards stripper cum separator (7) drops catalyst-adsorbent mixture close to the interface of catalyst and adsorbent bed;

a reactor (8) comprising said cyclones and having an outlet means (11) for taking out hydrocarbon vapors and steam mixture to fractionator(s);

a stripper cum separator (7) located at the bottom of the reactor for causing removal of strippable hydrocarbons from spent catalyst, and coked adsorbent mixture and segregating catalyst from adsorbent;

said stripper cum separator is with or without baffles/internals, an inlet means (6) at its base for introduction of steam in the upward direction so as to provide a superficial velocity sufficient to strip off all hydrocarbons and to segregate solids into two layers a, layer of spent catalyst (33) and another layer of coked adsorbent (32), an outlet means (12) at the bottom of the stripper cum separator for taking out spent catalyst through standpipe via valve means (13), another outlet means (22) at an intermediate location for removing coked adsorbent through stand pipe (22) via valve means (23);

an adsorbent regenerator (24) located below the level of the lower portion of the stripper cum separator for receiving the coked adsorbent from the intermediate location of the stripper cum separator and causing reactivation of the adsorbent thereof;

an inlet means (29) in the adsorbent regenerator for introduction of air or oxygen containing gas or steam, an outlet means (30) in flow communication with the second inlet means (2) of the riser for introduction of reactivated adsorbent via stand pipe (31), another outlet means (27) at its top for disposal of flue gas;

a catalyst regenerator (14) situated above the adsorbent regenerator is connected to stripper cum separator, an inlet (19) at the base of the regenerator for introducing air or oxygen containing gas for effectively burning coke deposited on the catalyst, an outlet (20) in flow communication with the fourth inlet (4) of riser for introduction of regenerated catalyst via slide valve (21) and an outlet means (17) at its top for disposal of flue gas.

4. The apparatus according to claim 1, wherein the particle size of the spent catalyst is smaller than that of coked adsorbent.

5. The apparatus according to claim 1, wherein the cracking catalyst having a particle size in the range of 20–200 microns and a particle density in the range of 1.0–1.8 g/cc.

6. The apparatus according to claim 1, wherein the adsorbent having a particle size in the range of 200–500 microns and a particle density in the range of 1.5–3.0 g/cc.

7. The apparatus according to claim 1, wherein the catalyst regenerator having two stage cyclones means (55 and 66) for separation of flue gas from adsorbent particles.

8. The apparatus according to claim 1, wherein the adsorbent regenerator having adsorbent cooler means (58) for removal of excess heat from adsorbent regenerator bed.

9. The apparatus according to claim 1, wherein the catalyst regenerator having two stage cyclones means (45 and 46) for separation of flue gas from catalyst particles.

10. The apparatus according to claim 1, where in a portion of the coked adsorbent is directly routed to the riser from stripper cum separator outlet (52) via stand pipes (60A) without undergoing reactivation step.

11. The apparatus according to claim 3, wherein the particle size of the spent catalyst is bigger than that of the coked adsorbent.

12. The apparatus according to claim 3, wherein the cracking catalyst having a particle size in the range of 200–500 microns and a particle density in the range of 1.5–3.0 g/cc.

13. The apparatus according to claim 3, wherein the adsorbent having a particle size in the range of 20–200 microns and a particle density in the range of 1.0–1.8 g/cc.

14. The apparatus according to claim 3, where in a portion of the coked adsorbent is directly routed to the riser from stripper cum separator outlet (22) via stand pipes (30A) without undergoing reactivation step.

15. The apparatus according to claim 1, wherein stripping of entrained hydrocarbons from spent catalyst-coked adsorbent mixture and segregation of spent catalyst from coked adsorbent take place simultaneously in the stripper cum separator.

16. The apparatus according to claim 1, wherein the rising bubbles are the driving forces for particle segregation in the stripper cum separator.

17. The apparatus according to claim 1, wherein the superficial gas velocity in stripper cum separator is in the range of 0.05–0.4 m/s, preferably in the range of 0.10–0.20 m/s for particle segregation.

18. The apparatus according to claim 1, wherein superficial velocity of the gas in the stripper cum separator varies within the range of ±20% of minimum fluidization velocity of larger and denser particles for ensuring fluidization and segregation.

19. The apparatus according to claim 1, wherein the superficial velocity in the adsorbent regenerator is in the range of 0.5–2.0 m/s, preferably in the range of 0.8–1.5 m/s.

20. The apparatus according to claim 1, wherein 100% segregation of catalyst from adsorbent is achieved even within the prevailing operating conditions of conventional fluid catalytic cracking strippers.

21. The apparatus according to claim 1, wherein the difference in minimum fluidization velocity of smaller and lighter particles and those of larger and denser particles is used to achieve the desired segregation.

22. The apparatus according to claim 1, wherein coked adsorbent that is separated from spent catalyst in stripper cum separator, is in reducing environment thereby eliminating adverse effects including the destruction of Zeolite structure of vanadium on the catalyst.

23. The apparatus according to claim 1, wherein the riser extends through stripper cum separator following the separation of hydrocarbon gas from catalyst-adsorbent mixture or an external riser.

24. The apparatus according to claim 1, wherein the mass flow rate of the adsorbent to the riser is such that the heat carried by the adsorbent is sufficient to vaporize heavy hydrocarbon feed stock and mass flow of adsorbent is in the range of 20–60 wt % of total solids circulation.

25. The apparatus according to claim 1, wherein said adsorbent comprises micro spheres selected from a group consisting of calcined clay, calcined and crushed coke, magnesium oxide, silicia-alumina and a bottom cracking additive for selective removal of metals and feed CCR.

26. The apparatus according to claim 1, wherein said catalyst comprises catalysts selected from a group consisting of Rare earth exchanged Y zeolite, ultra stable Y zeolite, non-crystalline acidic matrix and other zeolites selected from ZSM-5.

27. The apparatus according to claim 1, wherein partial and controlled burning is performed in said adsorbent regenerator to prevent temperature excursions beyond 690° C. to enhance the life of the adsorbent.

28. The apparatus according to claim 1, wherein diplegs of riser termination devices/reactor cyclones are located at the interface of spent catalyst and coked adsorbent mixture in stripper cum separator.

29. The apparatus according to claim 1, wherein stripping of entrained hydrocarbons from spent catalyst-coked adsorbent mixture and segregation of spent catalyst from coked adsorbent simultaneously take place in stripper cum separator.

30. The apparatus according to claim 1, wherein said stripper cum separator is with or without baffles/internals.

31. The apparatus according to claim 1, wherein the valve means provided on the stand pipes are slide valves.

* * * * *